United States Patent
Malhi

[11] Patent Number: 5,856,856
[45] Date of Patent: Jan. 5, 1999

[54] THIN PANEL LIQUID CRYSTAL DISPLAY SYSTEM

[75] Inventor: Satwinder Malhi, Garland, Tex.

[73] Assignee: Texas Instruments Incorporated, Dallas, Tex.

[21] Appl. No.: 565,481

[22] Filed: Nov. 30, 1995

[51] Int. Cl.⁶ ............................................. G02F 1/1333
[52] U.S. Cl. .......................................... 349/84; 349/158
[58] Field of Search .................................. 359/62, 82, 49, 359/59; 437/226; 216/97; 349/84, 158, 62, 41

[56] References Cited

U.S. PATENT DOCUMENTS

| | | | |
|---|---|---|---|
| 4,734,143 | 3/1988 | Meoni | 156/102 |
| 4,847,181 | 7/1989 | Shimokawa | 430/297 |
| 5,206,747 | 4/1993 | Wiley et al. | 359/51 |
| 5,302,436 | 4/1994 | Miller | 428/195 |
| 5,420,710 | 5/1995 | Nanbu | 359/49 |
| 5,477,423 | 12/1995 | Fredriksz et al. | 359/49 |

FOREIGN PATENT DOCUMENTS

| | | | |
|---|---|---|---|
| 53-12634 | 2/1978 | Japan | 359/62 |
| 54-143093 | 11/1979 | Japan | 359/61 |
| 55-4033 | 1/1980 | Japan | 359/62 |
| 55-117129 | 9/1980 | Japan | 359/62 |
| 55-155325 | 12/1980 | Japan | 359/62 |
| 56-25713 | 3/1981 | Japan | 359/62 |

*Primary Examiner*—William L. Sikes
*Assistant Examiner*—Toan Ton
*Attorney, Agent, or Firm*—Bret J. Petersen; James Kesterson; Richard Donaldson

[57] ABSTRACT

A method for producing a thin panel liquid crystal display system (20) for producing images comprising providing a mother glass (32) having at least two active glass substrates (34) therein, adhering the mother glass (32) to a handle substrate (38) to provide strength and rigidity to the mother glass (32), printing said active glass substrates (34) with grid lines, cutting the mother glass (32) between the active glass substrates (34), separating the active glass substrates (34) from one another, placing two active glass substrates (34) in parallel with one another, disbursing a plurality of glass beads on one of the active glass substrates (34), injecting liquid crystal display material between the active glass substrates (34), sealing the active glass substrates (34) together, and separating each of the active glass substrates (34) from the handle substrate (38).

17 Claims, 2 Drawing Sheets

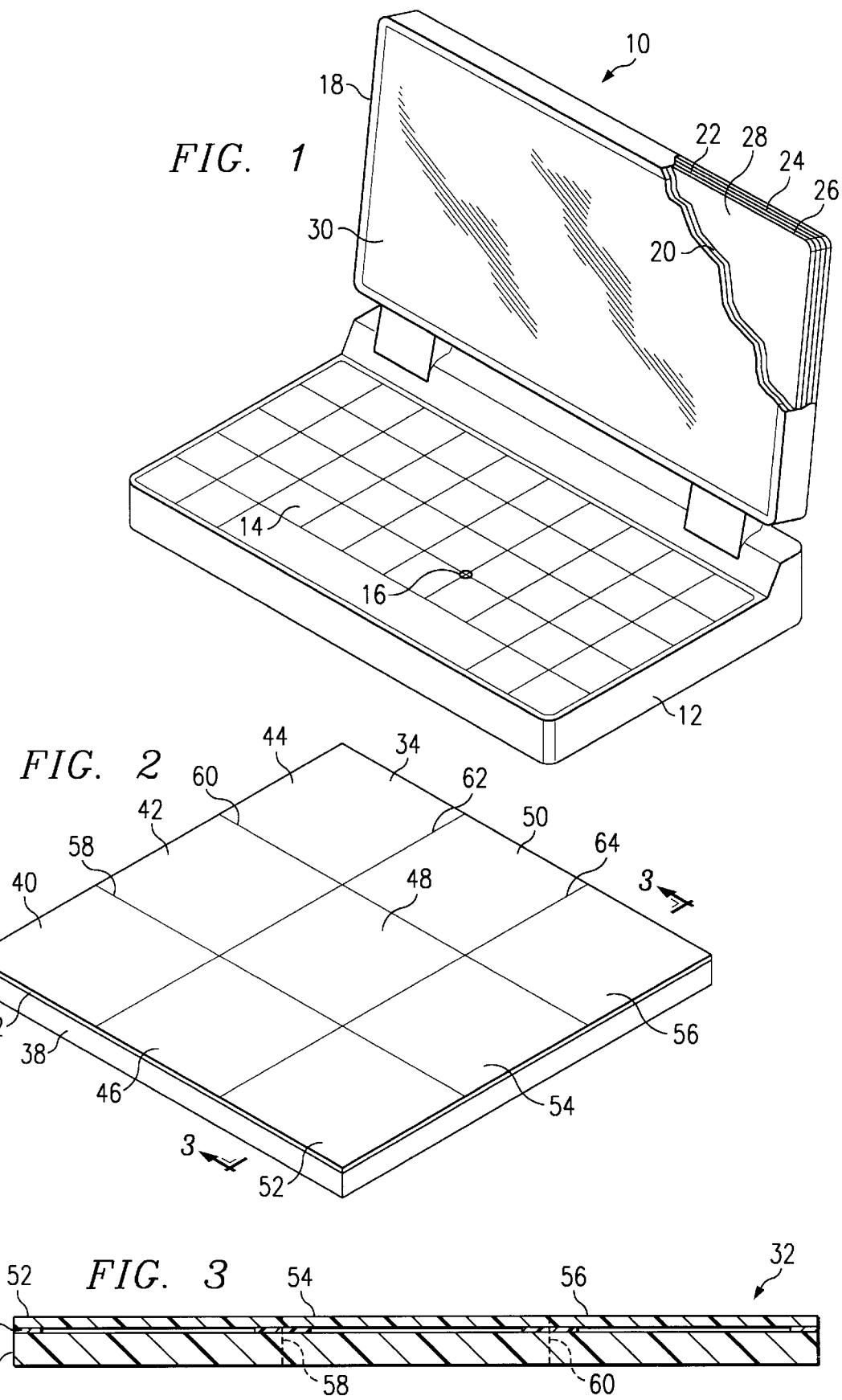

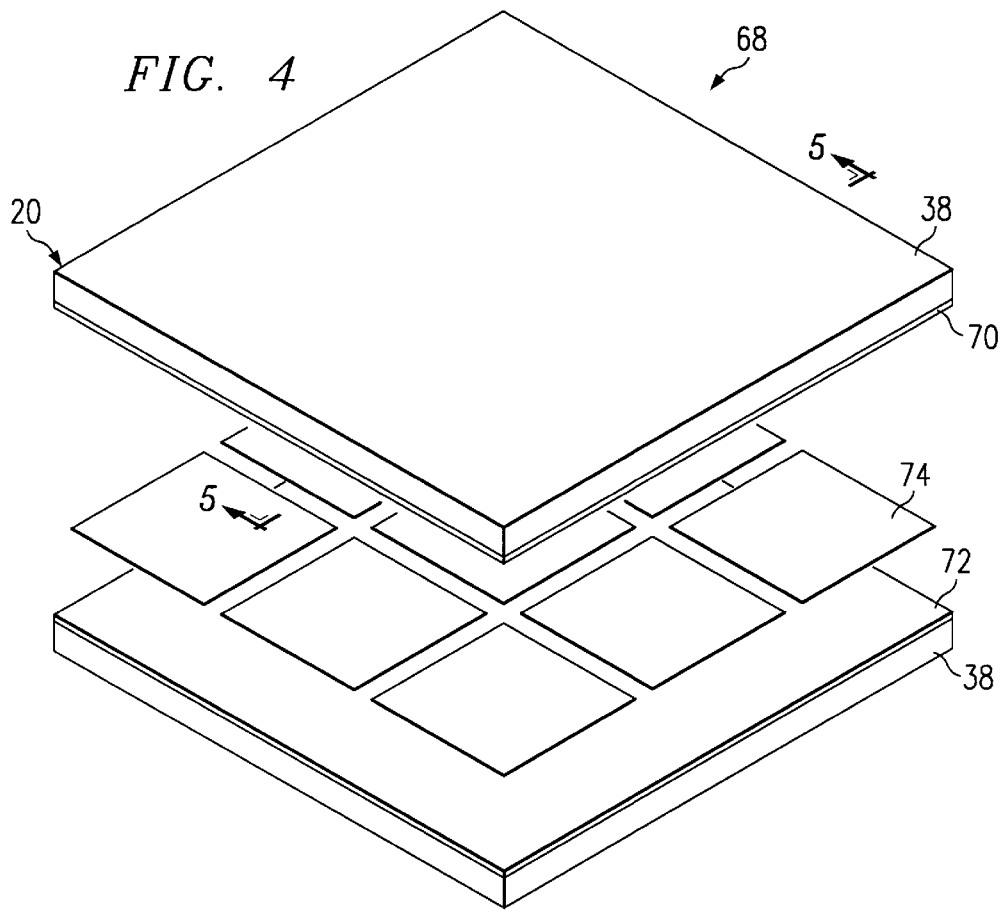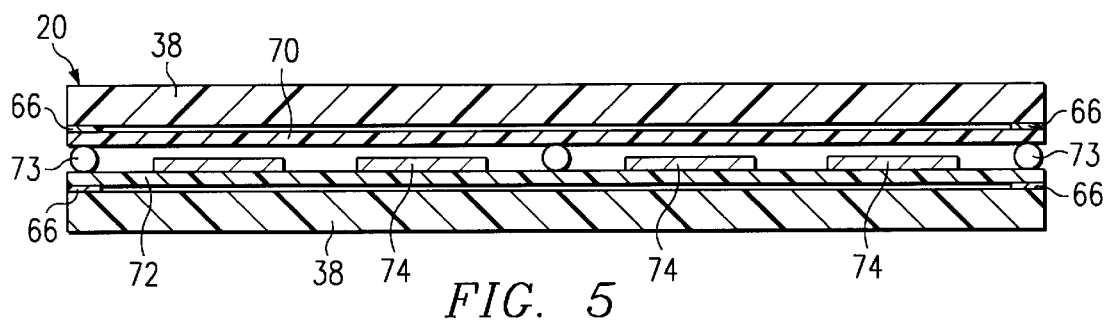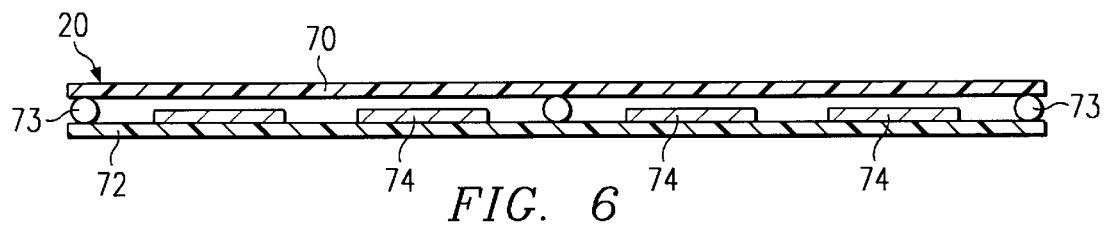

THIN PANEL LIQUID CRYSTAL DISPLAY SYSTEM

TECHNICAL FIELD OF THE INVENTION

This invention relates in general to a display device, and in particular to, a thin panel liquid crystal display system and a method for production of a thin panel liquid crystal display system for use in portable computer applications.

BACKGROUND OF THE INVENTION

Without limiting the scope of the invention, its background is described in connection with portable computer monitors, as an example.

Heretofore, in the field, there has been an increased demand for portable computer systems such as laptop, notebook, and recently, sub-notebook computers. The portable computers have dramatically increased the mobility of computing power for the computer user. Since the first portable computer, manufacturers have increased computer mobility by decreasing the size, weight, and power demands of portable computers while increasing the battery life for portable computers.

The monitors presently used for portable computer applications contribute greatly to the overall size and weight of the portable computer. Whether the monitor is monochrome display, dual-scan color display, or active matrix color display, the monitor must be of a sufficient size to provide the user with readable images. In addition, monitors place a great burden on available power resources.

Typically, portable computer monitors utilize a liquid crystal display system. The liquid crystal display systems typically includes a top glass panel and a bottom glass panel, having thin film transistors and liquid crystal material therebetween. The system drivers are generally integrated into a circuit board which surrounds the top glass panel and the bottom glass panel. These systems also utilize a backlight system that typically includes a diffuser for passing light evenly to the liquid crystal display, a cold cathode fluorescent lamp (CCFL) for producing light, a reflector for directing light toward the diffuser, and a light pipe located between the diffuser and the reflector to spread light to the entire surface of the diffuser.

The use of conventional liquid crystal display systems in the monitors of portable computer, however, creates a limiting factor in the continuing effort to reduce the size and weight of portable computers. In conventional liquid crystal display systems, the combination of the top glass panel and the bottom glass panel accounts for up to forty percent of the weight of the liquid crystal display system and also accounts for up to thirty percent of the thickness of the liquid crystal display system. Technological limitation presently prevent the manufacturing of liquid crystal display glass panels which have a thickness of less than 0.7 millimeters. Glass panels which are thinner than 0.7 millimeters are typically unable to withstand the stresses associated with the manufacturing process. Additionally, even as technological advances are made to reduce the size of other components of portable computers, the monitor must remain necessarily large in order to provide the user with readable text, graphics and video images of a sufficient size to minimize user eye strain.

SUMMARY OF THE INVENTION

It has been discovered that the use of conventional liquid crystal display monitors in portable computer applications has created a limiting factor with regard to the size and mobility of portable computers. What is needed is a method for producing active glass substrates for liquid crystal display monitors from thin glass panels which can be incorporated into a system for generating suitably sized images for portable computer applications.

The present invention disclosed herein comprises a mother glass, which includes a plurality of glass panels, that is adhered to a handle substrate which provides strength and rigidity to the mother glass during the manufacturing processes. During manufacturing, each glass panel of the plurality of glass panels is individually printed with grid lines creating a plurality of active glass substrate. The mother glass is cut between each of the active glass substrates, such that the active glass substrates may be separated from one another resulting in a plurality of individual active glass substrates.

In one embodiments of the present invention, each of the active glass substrates are separated from the corresponding handle substrate sections. Two active glass substrates from the plurality of active glass substrates from the mother glass are placed in parallel with one another, one being a top panel, the other being a bottom panel, such that the respective printed grid lines on each of the active glass substrates are adjacent. A plurality of glass beads is disbursed on either the top panel or the bottom panel. Liquid crystal display material is injected between the top panel and the bottom panel. The top panel and the bottom panel are sealed together thereby creating a liquid crystal display.

In another embodiment of the present invention, after cutting the mother glass into individual active glass substrate sections, two active glass substrates, which remain connected to the corresponding handle substrate sections, are placed in parallel with one another, such that the printed grid lines on each of the active glass substrates are adjacent. A plurality of glass beads is disbursed on one of the active glass substrates. Liquid crystal display material is injected between the active glass substrates. The two active glass substrates are sealed together and the handle substrate from each of the active glass substrates is removed thereby creating a liquid crystal display.

In yet another embodiment of the present invention, the active glass substrates are separated from the handle substrate leaving the handle substrate intact. The remnants of the active glass substrate and adhesive are removed from the handle substrate placing the handle substrate in a condition for reuse. Two active glass substrates, a top panel and a bottom panel, are placed in parallel with one another such that the respective printed grid lines on each of the active glass substrates are adjacent. A plurality of glass beads is disbursed on either the top panel or the bottom panel. Liquid crystal display material is injected between the top panel and the bottom panel. The top panel and the bottom panel are sealed together thereby creating a liquid crystal display.

These and other features of the present invention will be apparent to those skilled in the art from the following detailed description of the invention taken together with the accompanying drawings.

DESCRIPTION OF THE DRAWINGS

In the drawings:

FIG. 1 is a perspective representation of a notebook computer incorporating the thin panel liquid crystal display system of the present invention;

FIG. 2 is a schematic diagram of a mother glass including a plurality of active glass substrates;

FIG. 3 is a cross-sectional view of a mother glass taken along line 3—3 of FIG. 2;

FIG. 4 is an exploded view of one embodiment of the thin panel liquid crystal display system of the present invention;

FIG. 5 is a cross-sectional view of one embodiment of the thin panel liquid crystal display system taken along line 5—5 of FIG. 4; and FIG. 6 is a cross-sectional view of the thin panel liquid crystal display system of the present invention.

Corresponding numerals and symbols in different figures refer to corresponding parts unless otherwise indicated.

DETAILED DESCRIPTION OF THE INVENTION

The thin panel liquid crystal display system of the present invention decreases the thickness and the weight of a liquid crystal display by utilizing thin panel active glass substrates which are incorporated into a monitor of a portable computer that is light weight, small in size, and energy efficient while providing suitably sized images that are easy on the eyes of the user.

In FIG. 1, a thin panel liquid crystal display system incorporated into a notebook computer is generally designated 10. Notebook computer 12 has a keyboard 14 and a pointing device 16. Even though FIG. 1 depicts keyboard 14 and pointing device 16 as input devices, it should be understood by one skilled in the art that a variety of input devices are equally well-suited for the present invention including, but not limited to, a mouse, a trackball, or a microphone for voice-activated software such as Voice Assist by Creative Labs or Listen by Vertex.

Monitor housing 18 of notebook computer 12 contains the thin panel liquid crystal display system 20 of the present invention. Monitor housing 18 of notebook computer 12 further contains backlight system 22 which includes reflector 24, light pipe 26, diffuser 28, and a CCFL tube (not pictured). Even though FIG. 1 depicts backlight system 22 as the liquid crystal display illumination system, it should be understood by one skilled in the art that a variety of liquid crystal display illumination systems are equally well-suited for the present invention so long as the system provides sufficient illumination so that images created by thin panel liquid crystal display system 20 are easily viewable by the user on screen 30.

Referring to FIG. 2, a mother glass 32 including a plurality of active glass substrates 34 is depicted. Mother glass 32, which includes the plurality of active glass substrates 34, is adhered to handle substrate 38 such that handle substrate 38 provides strength and rigidity to mother glass 32. Optimally, mother glass 32 will have a thickness between about 0.7 millimeters and 0.1 millimeters. By way of example, if mother glass 32 is less than 0.5 millimeters in thickness, mother glass 32 may be adhered to a glass panel handle substrate 38 which has a thickness of at least 0.7 millimeters during the manufacturing processes. Even though handle substrate 38 has been described as a glass panel, it should be understood by one skilled in the art that a variety of materials are equally well-suited for the present invention including, but not limited to, plastic or other suitably rigid materials.

The plurality of active glass substrates 34 of mother glass 32 includes active glass substrates 40, 42, 44, 46, 48, 50, 52, 54, and 56. Each of the active glass substrates of the plurality of active glass substrates 34 of mother glass 32 is individually printed during the manufacturing process to add grid lines and other materials required for liquid crystal display processing.

In one embodiment of the present invention, after all the liquid crystal display processing on each mother glass 32 is completed, mother glass 32 is cut along lines 58, 60, 62 and 64 so that each active glass substrate along with the corresponding portion of handle substrate 38 can be separated for further processing. In another embodiment of the present invention, after all the liquid crystal display processing on each mother glass 32 is completed, mother glass 32 is cut along lines 58, 60, 62 and 64 so that each active glass substrate is separated from one another and from handle substrate 38. In this embodiment, handle substrate 38 remains unaltered such that after remnants of mother glass 32 are removed from handle substrate 38, handle substrate 38 may be reused.

Referring to FIG. 3, a cross-sectional diagram of mother glass 32 and handle substrate 38 taken along line 3—3 of FIG. 2 is depicted. Mother glass 32 includes active glass substrates 52, 54 and 56 and is adhered to handle substrate 38. Handle substrate 38 and mother glass 32 are adhered together by glue 66. Even though FIG. 3 has glue 66 as an adhesive, it should be understood by one skilled in the art that a variety of adhesives are equally well-suited for the present invention including, but not limited to, silicon based adhesives or polymer based adhesives.

Glue 66 is placed along the periphery between handle substrate 38 and mother glass 32 as well as along lines 58, 60, 62, and 64 as seen in FIG. 2, to create a high-strength, rigid composite structure in which mother glass 32 derives strength from the thicker handle substrate 38. After cutting mother glass 32 along lines 54, 56, 58 and 60, glue 66 is present around the periphery of each active glass substrate 52, 54, 56 and handle substrate 38 combination.

FIG. 4 depicts an exploded view of a thin panel liquid crystal display system generally designated 68. Two handle substrates 38 are adhered to top panel 70 and bottom panel 72 which are active glass substrates as described in reference to FIG. 2. Top panel 70 and bottom panel 72 have thin film transistor layer 74 therebetween. Even though FIG. 4 depicts thin panel liquid crystal display system 20 as having thin film transistor layer 74 for use in an active matrix display, it should be understood by one skilled in the art that a variety of display systems are equally well-suited for the present invention, including but not limited to a passive matrix liquid crystal display system.

In one embodiment of the present invention, a plurality of glass beads (not pictured) is disbursed on either top panel 70 or bottom panel 72 before top panel 70 and bottom panel 72 are attached to one another. The glass beads provide a separation between top panel 70 and bottom panel 72 such that liquid crystal display material (not pictured) may be injected between top panel 70 and bottom panel 72. Once liquid crystal display material is injected between top panel 70 and bottom panel 72, top panel 70 and bottom panel 72 are sealed together and electrically connected to the thin panel liquid crystal display system 20 drivers.

In FIG. 5 a cross-sectional view of the thin panel liquid crystal display system 20 taken along line 5—5 of FIG. 4 after top panel 70 and bottom panel 72 have been sealed together is depicted. Handle substrate 38 is adhered to top panel 70 by glue 66. Handle substrate 38 is adhered to bottom panel 72 by glue 66. Between top panel 70 and bottom panel 72 are glass beads 73, thin film transistor layer 74 and liquid crystal display material (not pictured). Even though FIG. 5 depicts thin panel liquid crystal display system 20 as having thin film transistor layer 74 for use in an active matrix display, it should be understood by one skilled in the art that a variety of display systems are equally well-suited for the present invention, including but not limited to a passive matrix liquid crystal display system.

In one embodiment of the present invention, handle substrate 38 which is adhered to bottom panel 72 is a thin panel, two dimensional array of CCFLs as described in the copending United States Patent Application filed on Nov. 20, 1995 entitled "Integrated Liquid Crystal Display and Backlight System" by Anthony B. Wood and Jeffrey E. Faris which is incorporated by reference hereinto. In this embodiment, handle substrate 38 remains adhered to bottom panel 72 after top panel 70 and bottom panel 72 are sealed together. Handle substrate 38 is removed from top panel 70.

In another embodiment of the present invention, handle substrate 38 which is adhered to bottom panel 72 is a light guide which spreads light evenly from a CCFL (not pictured) to thin panel liquid crystal display system 20. In this embodiment, handle substrate 38 remains adhered to bottom panel 72 after top panel 70 and bottom panel 72 are sealed together. Handle substrate 38 is removed from top panel 70.

In another embodiment, after top panel 70 and bottom panel 72 are sealed together, each corresponding handle substrate 38 is removed from top panel 70 and bottom panel 72.

In FIG. 6 a cross-sectional view of the thin panel liquid crystal display system 20 of the present invention is depicted. Top panel 70 and bottom panel 72 are sealed together. Between top panel 70 and bottom panel 72 are glass beads 73, thin film transistor layer 74 and liquid crystal display material (not pictured). Even though FIG. 6 depicts thin panel liquid crystal display system 20 as having thin film transistor layer 74 for use in an active matrix display, it should be understood by one skilled in the art that a variety of display systems are equally well-suited for the present invention, including but not limited to a passive matrix liquid crystal display system. Together, top panel 70 and bottom panel 72 result in a thin panel liquid crystal display system 20 having a thickness between about 1.4 millimeters and 0.2 millimeters.

In one embodiment of the present invention, each corresponding handle substrate 38 is separated from top panel 70 and bottom panel 72 prior to placing top panel 70 in parallel with bottom panel 72. In this embodiment, once handle substrate 38 is removed from top panel 70 and bottom panel 72, top panel 70 and bottom panel 72 are oriented such that the respective printed grid lines are adjacent and liquid crystal display material is injected between top panel 70 and bottom panel 72. Top panel 70 and bottom panel 72 are then sealed together.

While this invention has been described in terms of illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A method for producing a thin panel liquid crystal display comprising:
   providing a thin panel glass substrate;
   adhering said glass substrate to a handle substrate to provide rigidity to said glass substrate; and
   printing said glass substrate attached to said handle substrate with grid lines to form an active glass substrate.

2. The method for producing a thin panel liquid crystal display as recited in claim 1 wherein said active glass substrate is a top panel and further including the steps of:
   providing a second thin panel glass substrate, said second thin panel glass substrate being a bottom panel;
   adhering said bottom panel to a handle substrate to provide rigidity to said bottom panel;
   printing said bottom panel with grid lines;
   placing said top panel and said bottom panel in parallel with one another; and
   sealing said top panel to said bottom panel.

3. The method for producing a thin panel liquid crystal display as recited in claim 2 further including, before the step of placing said top panel and said bottom panel in parallel with one another, the step of disbursing a plurality of glass beads on one of said panels.

4. The method for producing a thin panel liquid crystal display as recited in claim 2 further including, before the step of sealing said top panel to said bottom panel, the step of injecting liquid crystal display material between said top panel and said bottom panel.

5. The method for producing a thin panel liquid crystal display as recited in claim 1 wherein said active glass substrate is part of a mother glass which includes a plurality of active glass substrates.

6. The method for producing a thin panel liquid crystal display as recited in claim 5 further including the steps of:
   cutting said mother glass between each of said active glass substrates;
   separating each of said active glass substrates from said handle substrate; and
   reusing said handle substrate.

7. The method for producing a thin panel liquid crystal display as recited in claim 5 further including the steps of:
   cutting said mother glass and said handle substrate between each of said active glass substrates; and
   separating each of said active glass substrates and handle substrates from adjacent active glass substrates and handle substrates.

8. The method for producing a thin panel liquid crystal display as recited in claim 2 further including, before the step of placing said top panel and said bottom panel in parallel with one another, the steps of:
   separating said top panel from said handle substrate; and
   separating said bottom panel from said handle substrate.

9. The method for producing a thin panel liquid crystal display as recited in claim 2 further including, after the step of sealing said top panel to said bottom panel, the steps of:
   separating said top panel from said handle substrate; and
   separating said bottom panel from said handle substrate.

10. The method for producing a thin panel liquid crystal display as recited in claim 1 wherein said handle substrate further includes a thin panel cold cathode fluorescent lamp.

11. The method for producing a thin panel liquid crystal display as recited in claim 1 wherein said handle substrate further includes a light guild.

12. A thin panel liquid crystal display system comprising:
   a top panel having a thickness of less than 0.3 millimeters and greater than 0.1 millimeters; and
   a bottom panel disposed in parallel with said top panel, said bottom panel having a thickness of less than 0.3 millimeters and greater than 0.1 millimeters.

13. The thin panel liquid crystal display system as recited in claim 12 further including a layer of liquid crystal material disposed between said top panel and said bottom panel.

14. The thin panel liquid crystal display system as recited in claim 12 wherein said thin panel liquid crystal display is incorporated into a portable computer.

15. A method for producing a thin panel liquid crystal display comprising:

providing an glass substrate having a thickness of less than 0.7 millimeters and greater than 0.1 millimeters;

adhering said active glass substrate to a handle substrate to provide rigidity to said active glass substrate; and printing said glass substrate attached to said handle substrate with grid lines to form an active glass substrate.

16. The method for producing a thin panel liquid crystal display as recited in claim 15 wherein said glass substrate is a top panel and further including the steps of:

providing a bottom panel having a thickness of less than 0.7 millimeters and greater than 0.1 millimeters;

adhering said bottom panel to a handle substrate to provide rigidity to said bottom panel;

printing said bottom panel substrate attached to said handle substrate with grid lines to form an active glass substrate;

placing said top panel and said bottom panel in parallel with one another; and sealing said top panel to said bottom panel.

17. The method for producing a thin panel liquid crystal display as recited in claim 16 wherein said top panel and said bottom panel each have a thickness of less than 0.3 millimeters.

* * * * *